US008714888B2

(12) United States Patent
Bean et al.

(10) Patent No.: US 8,714,888 B2
(45) Date of Patent: May 6, 2014

(54) POWER TOOL TRANSMISSION

(75) Inventors: Frederick R. Bean, Finksburg, MD (US); Jason McRoberts, Red Lion, PA (US); Ashok Samuel Baskar, Lutherville, MD (US); Micah A. Coleman, Baltimore, MD (US)

(73) Assignee: Black & Decker Inc., Newark, DE (US)

( * ) Notice: Subject to any disclaimer, the term of this patent is extended or adjusted under 35 U.S.C. 154(b) by 761 days.

(21) Appl. No.: 12/911,365

(22) Filed: Oct. 25, 2010

(65) Prior Publication Data

US 2012/0099936 A1 Apr. 26, 2012

(51) Int. Cl.
*B23B 47/14* (2006.01)

(52) U.S. Cl.
USPC .......................................... 408/124; 173/216

(58) Field of Classification Search
USPC ............. 173/48, 109, 178, 216, 217; 408/124
See application file for complete search history.

(56) References Cited

U.S. PATENT DOCUMENTS

| | | | | |
|---|---|---|---|---|
| 840,055 | A * | 1/1907 | Ferguson | 74/333 |
| 2,978,921 | A | 4/1961 | Donohoe | |
| 3,162,250 | A | 12/1964 | Sindelar | |
| 3,972,106 | A | 8/1976 | Orr | |
| 4,418,766 | A * | 12/1983 | Grossmann | 173/13 |
| 5,792,020 | A | 8/1998 | Kikuchi et al. | |
| 6,070,675 | A | 6/2000 | Mayer et al. | |
| 6,142,242 | A | 11/2000 | Okumura et al. | |
| 6,192,996 | B1 * | 2/2001 | Sakaguchi et al. | 173/48 |
| 6,431,289 | B1 | 8/2002 | Potter et al. | |
| 6,435,285 | B1 | 8/2002 | Tsai | |
| 6,502,648 | B2 | 1/2003 | Milbourne | |
| 6,655,470 | B1 | 12/2003 | Chen | |
| 6,676,557 | B2 | 1/2004 | Milbourne et al. | |
| 6,796,921 | B1 | 9/2004 | Buck et al. | |
| 6,805,207 | B2 | 10/2004 | Hagan et al. | |
| 6,824,491 | B2 | 11/2004 | Chen | |
| 6,857,983 | B2 | 2/2005 | Milbourne et al. | |
| 6,866,607 | B2 | 3/2005 | Nishiji et al. | |
| 6,984,188 | B2 | 1/2006 | Potter et al. | |
| 7,073,606 | B2 | 7/2006 | Mamber et al. | |
| 7,101,300 | B2 | 9/2006 | Milbourne et al. | |

(Continued)

FOREIGN PATENT DOCUMENTS

| | | | |
|---|---|---|---|
| EP | 2184138 | A2 | 5/2010 |
| JP | 61-025705 | A | 2/1986 |

(Continued)

*Primary Examiner* — Daniel Howell
*Assistant Examiner* — Chwen-Wei Su
(74) *Attorney, Agent, or Firm* — Harness, Dickey & Pierce, P.L.C.

(57) ABSTRACT

A power drill can comprise a housing having a motor that includes an output member. A rotary output spindle can be journaled in the housing. A transmission can be disposed in the housing and include a first output gear and a second output gear. The transmission can selectively couple the output member to the output spindle through one of the first output gear or the second output gear for rotating the output spindle at one of a first speed or a second speed, respectively. A speed shift assembly can include a guide plate and a user engageable member. The guide plate can selectively influence movement of the first and second output gears. The user engageable member can be movable between a first speed position and a second speed position. Movement between the first and second positions can cause the second output gear to at least partially nest into the first output gear.

27 Claims, 11 Drawing Sheets

(56) References Cited

U.S. PATENT DOCUMENTS

| | | | |
|---|---|---|---|
| 7,201,235 B2 | 4/2007 | Umemura et al. | |
| 7,220,211 B2 | 5/2007 | Potter et al. | |
| 7,223,195 B2 | 5/2007 | Milbourne et al. | |
| 7,308,948 B2 | 12/2007 | Furuta | |
| 7,314,097 B2 | 1/2008 | Jenner et al. | |
| 7,380,612 B2 | 6/2008 | Furuta | |
| 7,380,613 B2 | 6/2008 | Furuta | |
| 7,404,781 B2 | 7/2008 | Milbourne et al. | |
| 7,410,441 B2 | 8/2008 | Milbourne et al. | |
| 7,452,304 B2 | 11/2008 | Hagan et al. | |
| 7,455,615 B2 | 11/2008 | Chen | |
| 7,494,437 B2 | 2/2009 | Chen | |
| 7,513,845 B2 | 4/2009 | Ho | |
| 7,537,064 B2 | 5/2009 | Milbourne et al. | |
| 7,607,493 B2 * | 10/2009 | Erhardt | 173/216 |
| 2005/0022358 A1 | 2/2005 | Hagan et al. | |
| 2005/0028997 A1 | 2/2005 | Hagan et al. | |
| 2005/0061524 A1 | 3/2005 | Hagan et al. | |
| 2005/0070399 A1 | 3/2005 | Redfield | |
| 2007/0201748 A1 | 8/2007 | Bixler et al. | |
| 2008/0173459 A1 | 7/2008 | Kuroyanagi et al. | |
| 2009/0098971 A1 | 4/2009 | Ho et al. | |
| 2009/0101376 A1 | 4/2009 | Walker et al. | |
| 2009/0160371 A1 | 6/2009 | Inagaki et al. | |
| 2009/0173510 A1 | 7/2009 | Milbourne et al. | |
| 2009/0200053 A1 | 8/2009 | Scrimshaw et al. | |
| 2009/0200758 A1 | 8/2009 | Lam et al. | |
| 2009/0208827 A1 | 8/2009 | Kondo | |
| 2010/0163261 A1 * | 7/2010 | Tomayko et al. | 173/47 |
| 2010/0193207 A1 | 8/2010 | Mok et al. | |

FOREIGN PATENT DOCUMENTS

| | | | |
|---|---|---|---|
| JP | 5-248499 A | 9/1993 |
| JP | 2005-118961 A | 5/2005 |
| WO | WO-0075475 A1 | 12/2000 |

* cited by examiner

POWER TOOL TRANSMISSION

FIELD

The present disclosure relates to power tools, and more particularly to a transmission and speed shift assembly for a multi-speed power drill.

BACKGROUND

The statements in this section merely provide background information related to the present disclosure and may not constitute prior art.

Hammer drills generally include a floating rotary-reciprocatory output spindle journaled in the housing for driving a suitable tool bit coupled thereto. In operation, the spindle can be retracted axially within the housing and against the force of a suitable resilient means, upon engagement of the tool bit with a workpiece and a manual bias force exerted by the operator on the tool. A fixed hammer member can be secured in the housing, and a movable hammer member can be carried by the spindle. The movable hammer member can have a ratcheting engagement with the fixed hammer member to impart a series of vibratory impacts to the spindle in a "hammer drilling" mode of operation. A shiftable member can act upon the spindle to change from a "drilling" mode to the "hammer drilling" mode, and vice versa. In the drilling mode, the cooperating hammer members are spaced too far apart and hence do not engage each other. In the hammer drilling mode, the spacing between the ratcheting teeth is reduced, and the cooperating hammer members impart vibratory impacts to the spindle.

Hammer drills, or more generally, rotary output tools such as power drills can have a transmission that allows a user to shift between multiple output gears to optimize speed and torque for a given application. Typically, the multiple output gears can have various sizes to achieve a desired rotational output. In many cases, a user can shift the transmission to align a desired gear as the driven output gear. Because space may be limited within the housing of such power drills, it can be desirable to optimize the internal component configuration to allow for robust shifting and operation.

SUMMARY

A power drill can comprise a housing having a motor that includes an output member. A rotary output spindle can be journaled in the housing. A transmission can be disposed in the housing and include a first output gear and a second output gear. The transmission can selectively couple the output member to the output spindle through one of the first output gear or the second output gear for rotating the output spindle at one of a first speed or a second speed, respectively. A speed shift assembly can include a guide plate and a user engageable member. The guide plate can selectively influence movement of the first and second output gears. The user engageable member can be movable between a first speed position that corresponds to the first output gear being coupled for rotation with the output member and a second speed position that corresponds to the second output gear being coupled for rotation with the output member. Movement between the first and second positions can cause the second output gear to at least partially nest into the first output gear.

According to additional features, the first output gear can include an annular depression that selectively receives an annular extension on the second output gear in a nested position. The first output gear can include a first circumferential sidewall. The second output gear can include a second circumferential sidewall. The first circumferential sidewall can surround at least portions of the second output gear in the nested position. In one example, more than half of an axial length of the second circumferential sidewall can be nested into an axial length of the annular depression in the nested position. A biasing member can be disposed between the first and the second output gears.

The biasing member can be configured to urge the first output gear away from the second output gear while complementary teeth on the first output gear and the output member align during engagement of the first output gear with the output member. The biasing member can be configured to urge the second output gear away from the first output gear while complementary teeth on the second output gear and the output member align during engagement of the second output gear with the output member.

According to still other features, the guide plate can comprise a U-shaped body having opposing side flanges that are connected by an intermediate portion. The opposing side flanges can alternatively engage one of the first or second gears during shifting between the first and second speed positions, respectively. The intermediate portion can define a slot that is configured to receive an actuator pin associated with the user engageable member. The actuator pin can be guided along the slot during movement of the user engageable member between the first and second speed positions. The user engageable member can comprise a knob configured for complete 360° rotation around an axis. Rotation of the knob can influence linear translation of the guide plate along a guide rod during movement of the user engageable member between the first and second positions.

According to other features, the power drill can further include a rotatably fixed hammer member and a rotatable hammer member that are each mounted concentrically about the output spindle. The rotatable hammer member can be mounted on the spindle for concurrent rotation therewith. The rotatable hammer member can cooperate with the rotatably fixed hammer member to deliver vibratory impacts to the output spindle in a hammer drilling mode.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

While the following description is specifically directed toward a transmission and speed shift assembly for a hammer drill, the same may be implemented in other rotary output devices, such as conventional power drills, for example. Furthermore, while the following description specifically describes a two-speed transmission, the same may be applied to other transmissions, such as those having more than two speeds.

Figure 1:
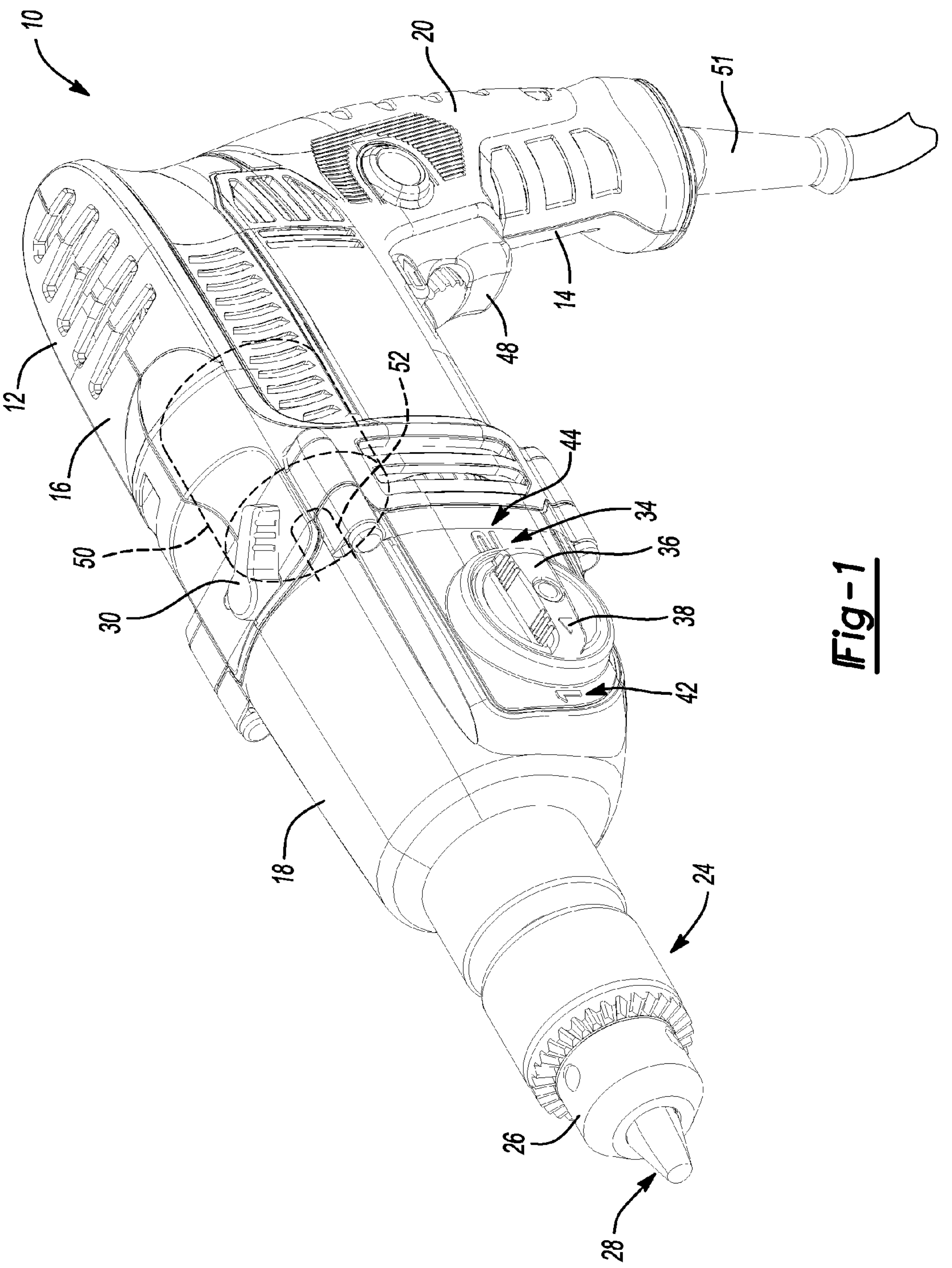
FIG. 1 is a perspective view of an exemplary multi-speed hammer drill constructed in accordance with the teachings of the present disclosure.

With initial reference to FIG. 1, an exemplary hammer drill constructed in accordance with the present teachings is shown and generally identified at reference numeral 10. The hammer drill 10 can include a housing 12 having a handle 14. The housing 12 can generally comprise a rearward housing 16, a forward housing 18 and a handle housing 20. The rearward housing 16, the forward housing 18 and the handle housing 20 can be formed of separate components or combined in various manners. For example, the handle housing 20 can be combined as part of a single integral component forming at least some portions of the rearward housing 16. A chuck assembly 24 can extend from the forward housing 18. The chuck assembly 24 can generally include a chuck body 26 and a plurality of movable jaws 28. The movable jaws 28 can be configured in a convention manner to expand and contract for selectively retaining a drill bit (or other suitable implement) therein.

A hammer shifter 30 can be rotatably disposed on the housing 12. As will become appreciated from the following discussion, the hammer shifter 30 can be selectively rotatable between a first position that corresponds to a hammer drill mode and a second position that corresponds to a normal drilling mode. A speed shift knob 34 can be rotatably disposed on the housing 12. In one example, the speed shift knob 34 can comprise a user engagement portion 36 having an indicator 38. Indicia, collectively referred to at reference numeral 40 and individually identified at reference numerals 42 and 44 can be provided on the housing 12 proximate to the speed shift knob 34. In one example, the indicia 42 can correspond to a low speed position while the indicia 44 can correspond to a high speed position.

A trigger 48 can be disposed on the handle 14 of the housing 12 for selectively activating a motor 50. The hammer drill 10 according to this disclosure is an electric drill having a power cord 51. It can be appreciated, however, that the hammer drill 10 can be powered with other energy sources, such as a battery, pneumatically-based power supplies and/or combustion-based power supplies, for example.

Figure 2:
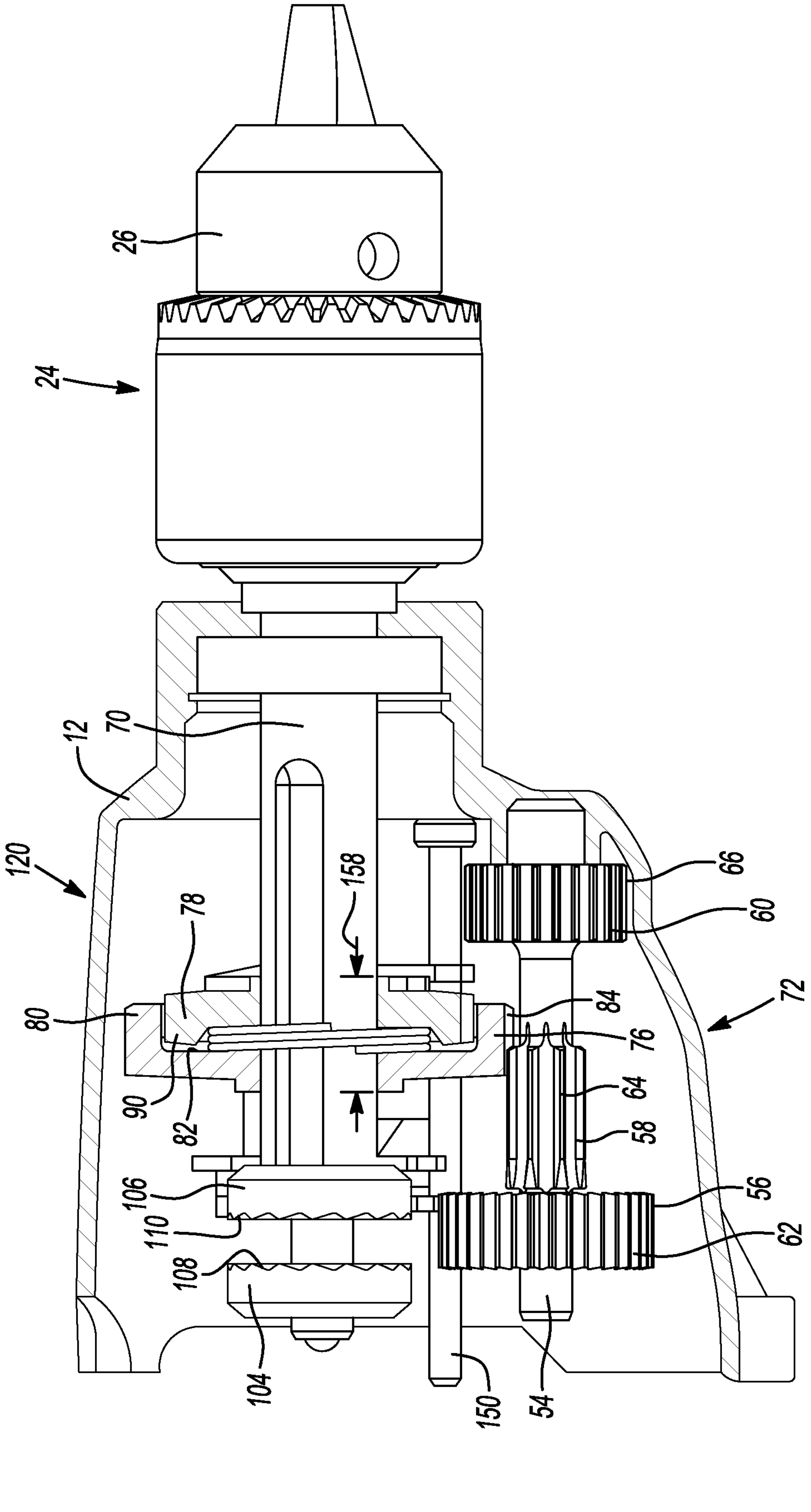
FIG. 2 is a partial cross-sectional view of a transmission of the hammer drill of FIG. 1 and shown with a first and second output gear in a nested position prior to engagement of the first output gear with a first reduction pinion in a first (low) speed position.

With continued reference to FIG. 1 and additional reference now to FIGS. 2-6, additional features of the hammer drill 10 will be described in greater detail. An output member 52 (FIG. 1) of the motor 50 can be rotatably coupled to a pinion shaft 54 (FIG. 2). The pinion shaft 54 can include a first reduction gear 56, a first reduction pinion 58 and a second reduction pinion 60. In some examples, the first reduction gear 56 can include teeth 62 that are splined for rotation with the motor output 52 or other intermediate gears (not specifically shown). The first reduction pinion 58 can include teeth 64 that are dedicated for driving engagement while in the first (or low) speed output mode. The second reduction pinion 60 can include teeth 66 that can be configured for driving engagement while in the second (or high) speed output mode.

Figure 6:
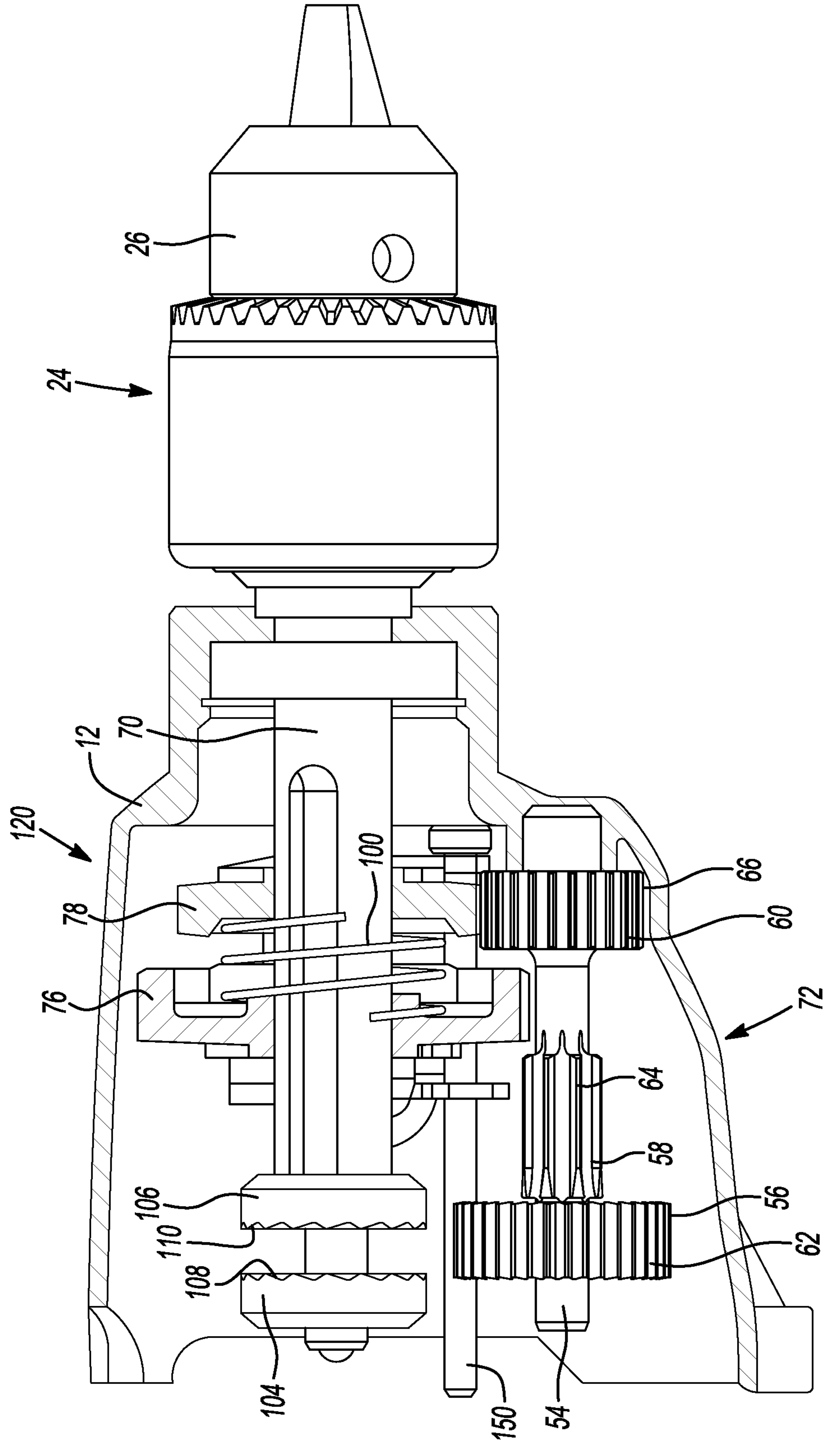
FIG. 6 is a partial cross-sectional view of the transmission of FIG. 2 and shown with the second output gear meshingly engaged to the second reduction pinion in the second (high) speed position.

A floating rotary output spindle 70 can be journaled in the housing 12. The output spindle 70 can be driven by the motor 50 (FIG. 1) through a transmission 72 (FIG. 2). The output spindle 70 can extend outwardly from the housing 12 to the chuck body 26 of the chuck assembly 24. The transmission 72 can generally comprise a first or low output gear 76 and a second or high output gear 78. As will become appreciated from the following discussion, the second gear 78 can be configured to at least partially nest within an outer dimension of the first gear 76 (as shown in FIG. 2), such as during shifting between the first (low) speed position (FIG. 3) and a second (high) speed position (FIG. 6).

Figure 3:
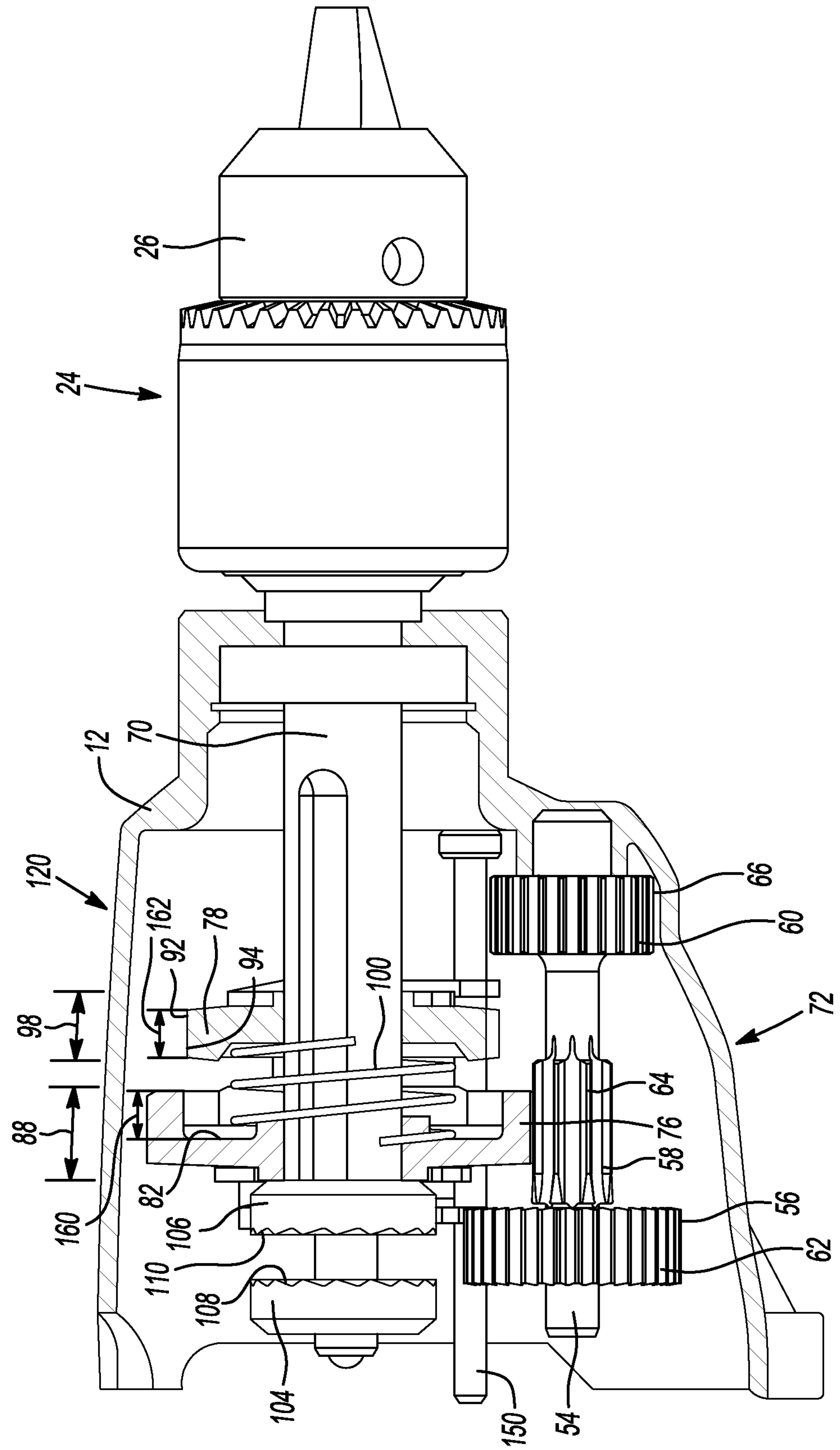
FIG. 3 is a partial cross-sectional view of the transmission shown in FIG. 2 and illustrated with the first gear meshingly engaged with the first reduction pinion in the low speed position.

The first gear 76 can generally comprise an outer circumferential sidewall 80 and a first annular depression 82. Teeth 84 can be formed around the circumferential sidewall 80 of the first gear 76. The first gear 76 can have an axial thickness 88 (FIG. 3). The second gear 78 can have a second annular extension 90 and a circumferential sidewall 92. Teeth 94 (FIG. 3) can be formed around the circumferential sidewall 92 of the second gear 78. The second gear 78 can have an axial thickness 98. The teeth 84 on the first gear 76 can be configured to meshingly engage the teeth 64 on the first reduction pinion 58 in the low speed position (FIG. 3). The teeth 94 on the second gear 78 can be configured to meshingly engage the teeth 66 on the second reduction pinion 60 when in the second speed position (FIG. 6).

With further reference now to FIGS. 3-6, additional features of the transmission 72 will be further described. A biasing member 100 can be journaled around the output spindle 70 and positioned generally between the first gear 76 and the second gear 78. As will be described herein, the biasing member 100 can be configured to urge the first gear 76 into meshed engagement with the first reduction pinion 58. Similarly, the biasing member 100 can be configured to urge the second gear 78 into meshed engagement with the second reduction pinion 60.

The hammer drill 10 can include a pair of cooperating hammer members 104 and 106. The hammer members 104 and 106 can be generally located within the forward housing 18. It is appreciated that the hammer members 104 and 106 may alternatively be located elsewhere in the hammer drill

10. The hammer member 104 can be an axially movable hammer member that is fixed for rotation with the output spindle 70. The hammer member 104 can be permitted limited axial movement, but not permitted to rotate with the output spindle 70. The hammer member 106 can be carried by the output spindle 70 conjoint rotation therewith by press-fitting or otherwise suitable construction.

The hammer members 104 and 106 can have cooperating ratcheting teeth 108 and 110, respectively, which are conventional for delivering the desired vibratory impacts to the output spindle 70 in the hammer drill mode of operation. Rotation of the hammer shifter 30 can influence engagement of the respective hammer members 104 and 106.

Figure 7:
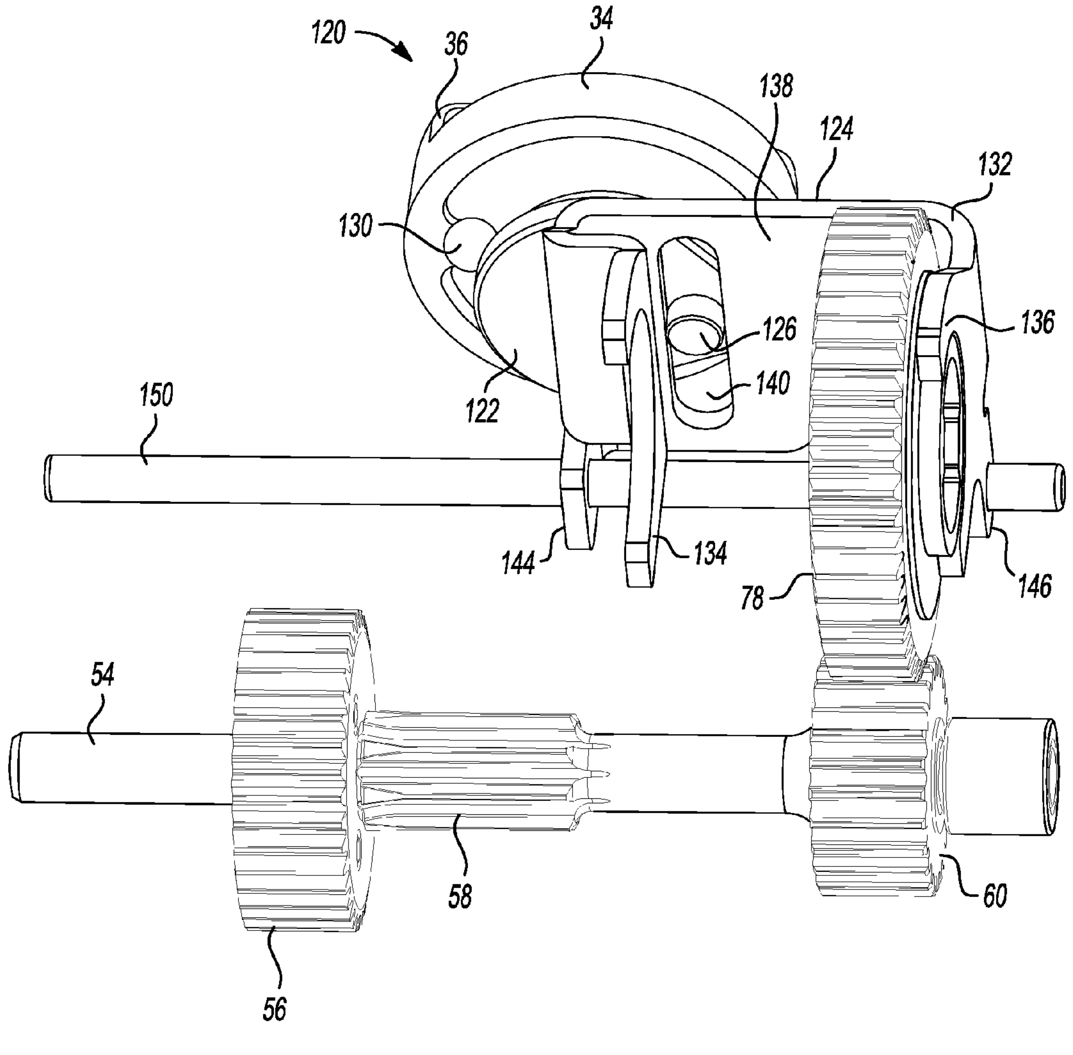
FIG. 7 is a perspective view of a speed shift assembly of the hammer drill of FIG. 1 and shown with a speed shift knob in the high speed position.
Figure 8:
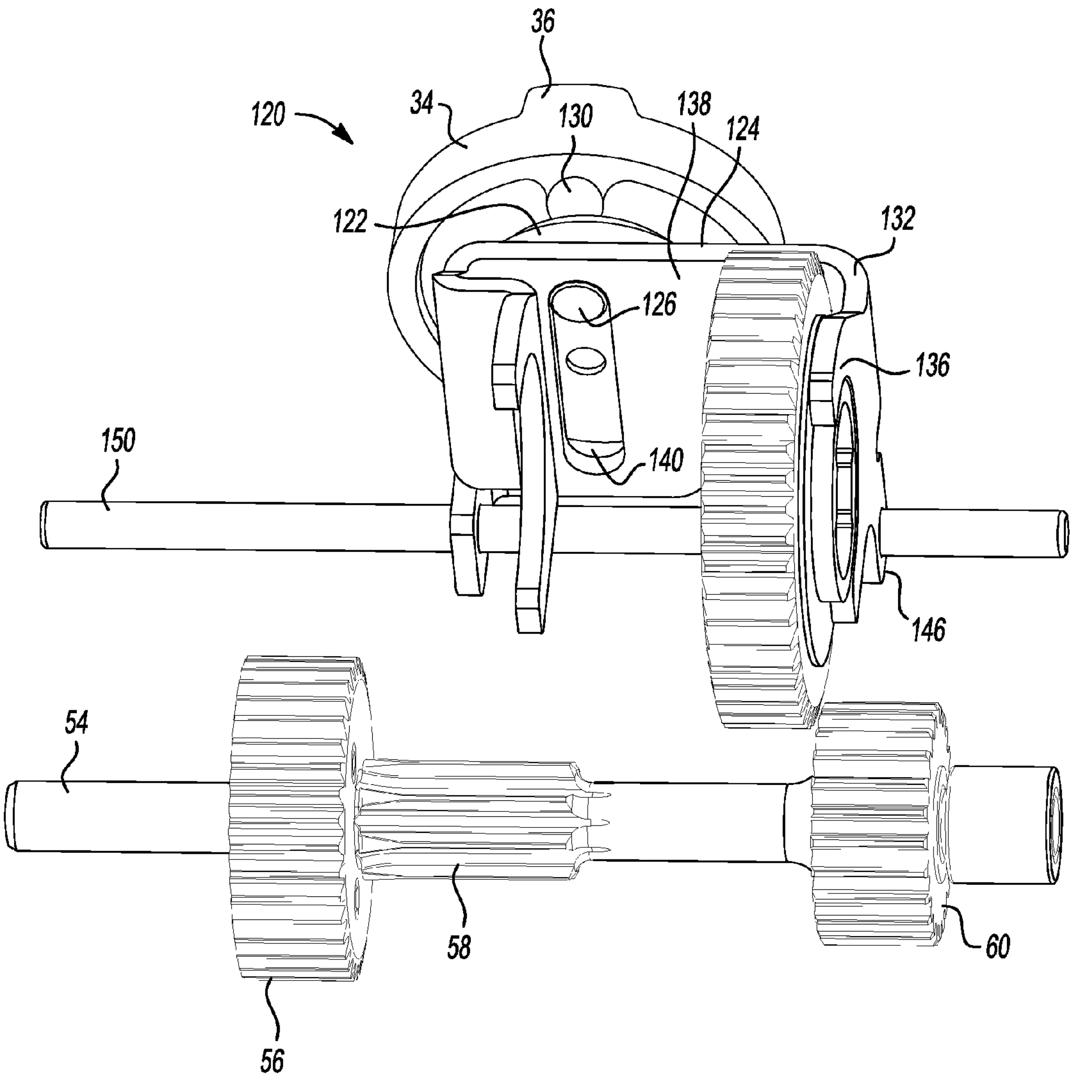
FIG. 8 is a perspective view of the speed shift assembly of FIG. 7 and shown with the speed shift knob rotated about 90° clockwise (as viewed from FIG. 1) relative to the position illustrated in FIG. 7.

With specific reference now to FIGS. 7-10, additional features of the hammer drill 10 will be further described. The hammer drill 10 can further comprise a speed shift assembly 120 that includes the speed shift knob 34, a shift plate 122 and a guide plate 124. For clarity, the first gear 76 is not shown in FIGS. 7-10 to better illustrate features of the speed shift assembly 120. The speed shift assembly 120 can be used with the nesting first and second gears 76 and 78 described herein or alternatively can be used with a non-nesting gear arrangement. As will become appreciated by the following discussion, the speed shift assembly 120 can be used with the transmission 72. According to one example, the shift plate 122 can be fixed for rotation with the speed shift knob 34 and include an actuator pin 126 extending proud therefrom. The speed shift knob 34 can further comprise a pair of spring-biased pins 130 (FIGS. 7 and 8). The guide plate 124 can generally comprise a U-shaped body 132 having a pair of opposing side flanges 134 and 136, respectively. The side flanges 134 and 136 can be connected by an intermediate portion 138. The intermediate portion 138 can define a slot 140 that receives the actuator pin 126. The guide plate 124 can include mounts 144 and 146 that slidably communicate along a guide rod 150.

The speed shift assembly 120 is illustrated in FIG. 7 in the second (or high) speed position. In the second speed position, the second gear 78 is meshingly engaged to the second reduction pinion 60. Rotation of the speed shift knob 34 can cause the actuator pin 126 to travel along the slot 140. The configuration of the shift assembly 120 according to the present teachings allows for rotation of the speed shift knob 34 in either of the clockwise or counterclockwise directions. Furthermore, the speed shift knob 34 is configured for complete 360° rotation in either direction without encountering any hard stops. In one example, as the user rotates the speed shift knob 34 in the clockwise direction (as viewed from FIG. 1) 90° from the position shown in FIG. 7 to the position shown in FIG. 8, the actuator pin 126 will be guided along the slot 140.

Figure 9:
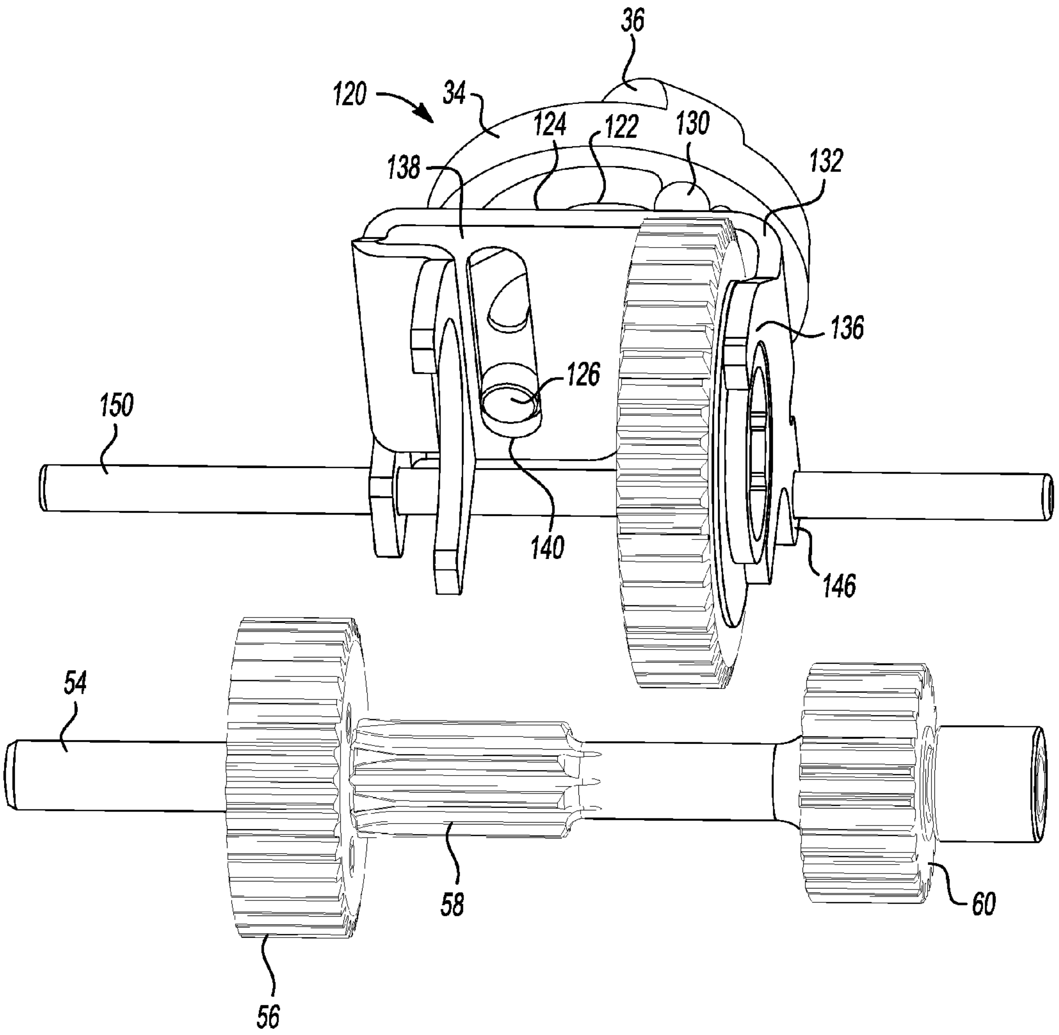
FIG. 9 is a perspective view of the speed shift assembly of FIG. 7 and shown with the speed shift knob rotated counter-clockwise (as viewed from FIG. 1) relative to the position shown in FIG. 7.
Figure 10:
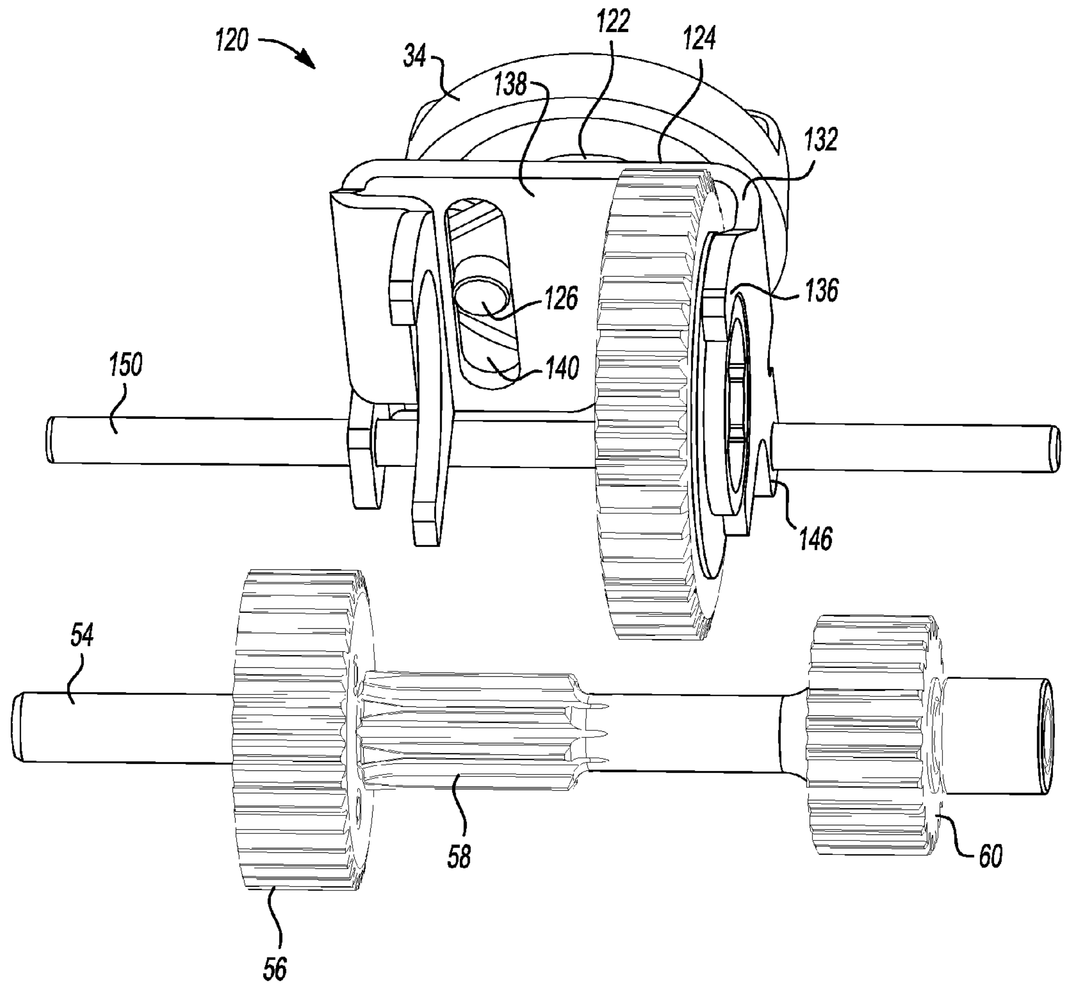
FIG. 10 is a perspective view of the speed shift assembly of FIG. 7 and shown with the speed shift knob rotated 180° relative to the position shown in FIG. 7 and corresponding to the low speed position.

Movement of the actuator pin 126 along the slot 140 can cause the guide plate 124 to slidably translate in a direction leftward as viewed from FIG. 7. The spring biased pins 130 can be configured to selectively locate within a complementary depression provided in the forward housing 18 to provide a user with tactile feedback indicating that the speed shift knob 34 has been sufficiently located into either of the low speed position (indicator 38 aligned with the low speed indicia 42, FIG. 1) or the high speed position (indicator 38 aligned with the high speed indicia 44, FIG. 1). FIGS. 9 and 10 illustrate the speed shift knob 34 rotated at various positions.

Returning now to FIGS. 2-6, operation of the transmission 72 and speed shift assembly 120 according to various examples of the present teachings will be described. As illustrated in FIG. 2, the speed shift knob 34 has been rotated to the low speed position causing the flange 136 to urge the second gear 78 into the nesting relationship with the first gear 76. While in a nested position, a thickness or axial distance 158 can be provided between an outermost surface of the first gear 76 (that opposes the flange 134) and an outermost surface of the second gear 78 (that opposes the flange 136). The thickness or axial distance 158 is less than a sum of the axial thickness 88 of the first gear 76 and the axial thickness 98 of the second gear 78. Explained differently, while in the nested position (FIG. 2), the first and second gears 76 and 78 occupy a reduced axial space as compared to an axial space when side-by-side or adjacent to each other. According to one example, the first annular depression 82 can define an axial length or distance 160 (FIG. 3). The circumferential sidewall 92 of the second gear 78 can have an axial length or distance 162. According to one example, more than half of the axial distance 162 of the circumferential sidewall 92 can be nested into the axial distance 160 of the annular depression 82 of the first gear 76 in the nested position (FIG. 2). According to one example, substantially about 90% of the circumferential sidewall 92 (or axial distance 162) can be nested into the annular depression 82 (or axial distance 160) in the nested position. By way of example, the axial distance 160 can be about 7.2 mm and the axial distance 162 can be about 8 mm. Other dimensions are contemplated. Furthermore, various features may be modified to accommodate up to 100% of the circumferential sidewall 92 into the annular depression 82.

While in the position shown in FIG. 2, the biasing member 100 is compressed and providing an outward biasing force (in a direction leftward as viewed in FIG. 2) against the first gear 76. The biasing force can facilitate movement of the first gear 76 into meshing alignment with the first reduction pinion 58. In this regard, the biasing member 100 can urge the first gear 76 leftward until the respective teeth 84 on the first output gear 76 align with the teeth 64 on the first reduction pinion 58. Once the respective teeth 84 and 64 align, the first gear 76 slidably translates along the output spindle 70 to the position shown in FIG. 3. Once in the position shown in FIG. 3, the low gear 76 is meshed for rotation with the first reduction pinion 58 in the low speed position.

Figure 4:
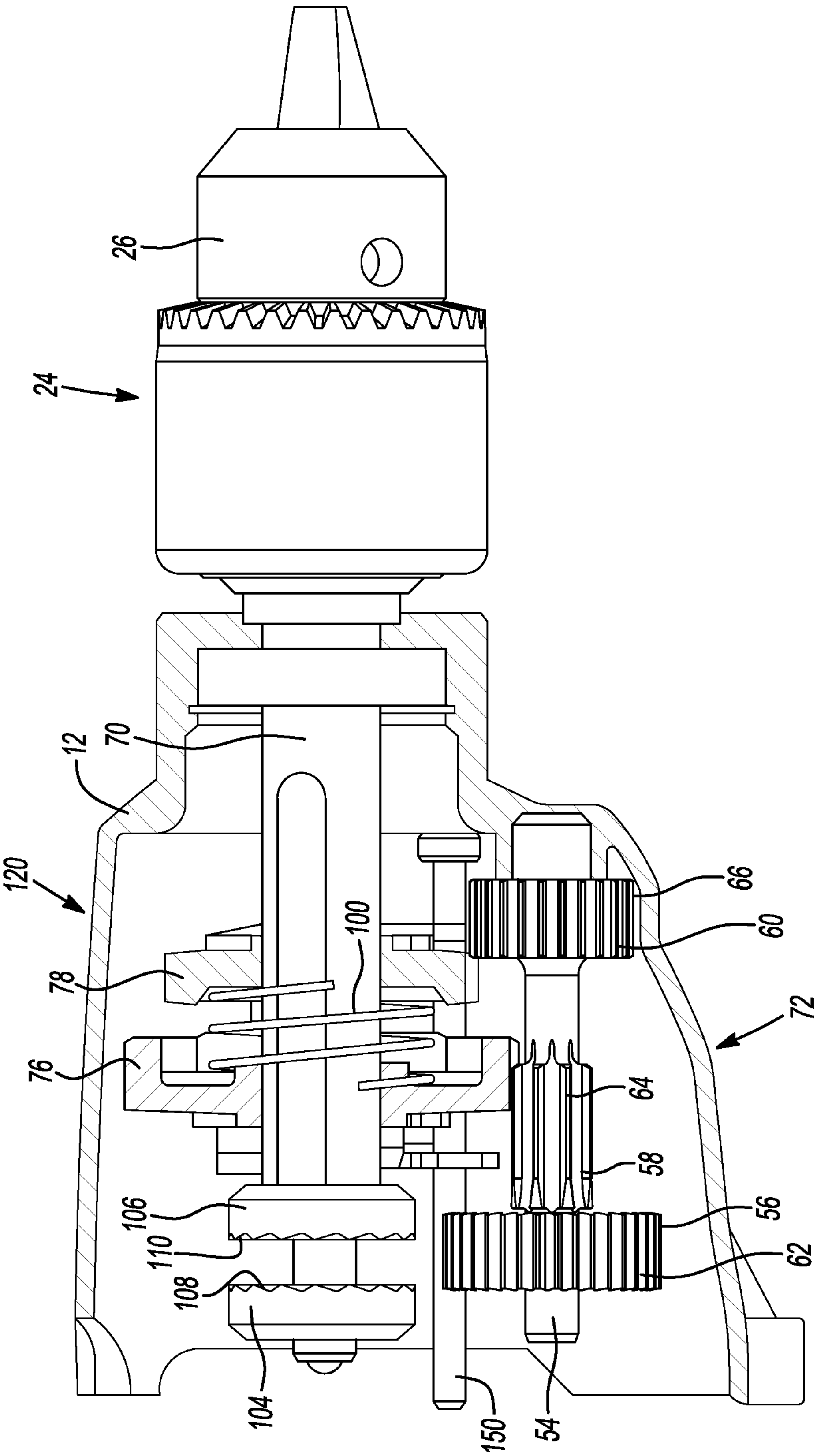
FIG. 4 is a partial cross-sectional view of the transmission shown in FIG. 2 and illustrated with the guide plate initially moved along the guide rod to urge the second gear toward the second reduction pinion.
Figure 5:
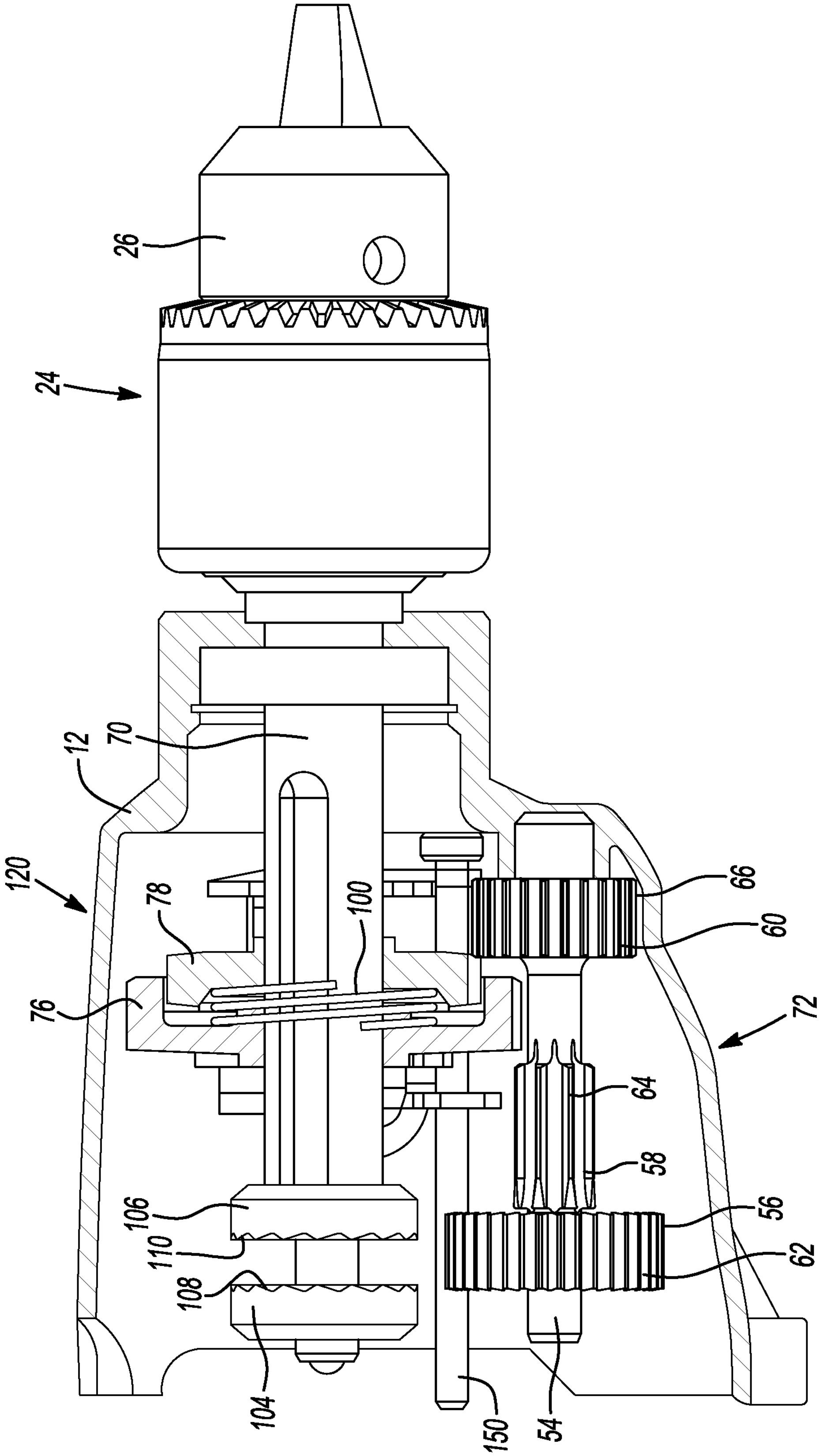
FIG. 5 is a partial cross-sectional view of the transmission shown in FIG. 2 and illustrated with the guide plate further advanced in a direction toward the second reduction pinion and with the first and second output gears partially nested prior to engagement of the second output gear with the second reduction pinion.

When the user rotates the speed shift knob 34 toward the high speed position, the flange 134 urges the first gear 76 rightward and out of meshing engagement with the teeth 64 of the first reduction pinion 58 (see FIGS. 4-5). In some examples where the second gear 78 does not initially align for meshing engagement with the second reduction pinion 60, the second gear 78 can at least partially nest into the first gear 76 (FIG. 5). Again, the biasing member 100 can bias the second gear 78 in a direction rightward until a time at which the teeth 94 of the second gear 78 are aligned to meshingly engage the teeth 66 of the second reduction pinion 60. At such a time, the second gear 78 will be further biased rightward into the position shown in FIG. 6. With the second gear 78 advanced to the position shown in FIG. 6, the teeth 66 of the second reduction pinion 60 are meshingly engaged with the teeth 94 of the second gear 78 and the transmission 72 will operate in the high speed mode.

Figure 11:
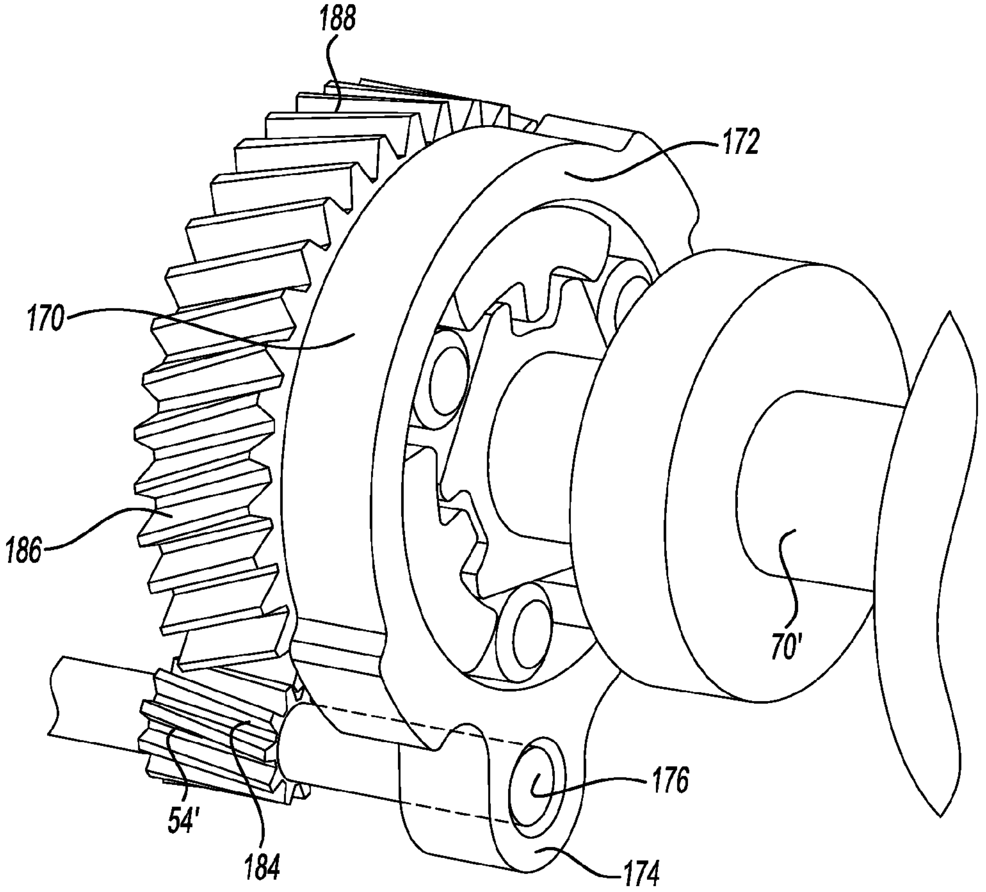
FIG. 11 is a partial perspective view of a spindle lock ring constructed in accordance to additional features of the present teachings and illustrated assembled relative to a motor armature pinion.
Figure 12:
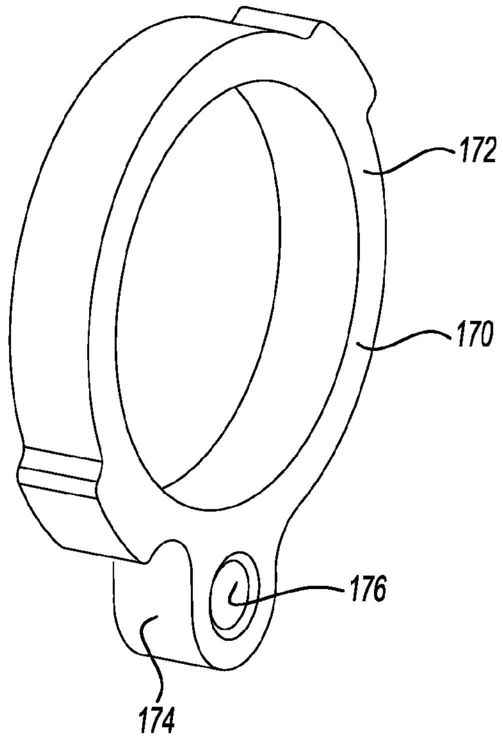
FIG. 12 is a perspective view of the spindle lock ring of FIG. 11.

Turning now to FIGS. 11 and 12, a spindle lock ring 170 constructed in accordance to additional features will be described. The spindle lock ring 170 can be used with a multi-speed transmission 72 discussed herein or alternatively with a single speed transmission. In general, the spindle lock ring 170 can surround an output spindle 70'. The spindle lock ring 170 can be fixed for rotation relative to the output spindle 70'. The spindle lock ring 170 can have a body 172 that includes a radial projection portion 174. A bore 176 can be formed through the radial projection portion 174 of the body 172. The bore 176 can define a through bore or a blind bore.

The bore 176 of the spindle lock ring 170 can receive at least a portion of a motor armature pinion 54'. The motor armature pinion 54' can have teeth 184 that are threadably meshed for rotation with teeth 186 of an output gear 188. The spindle lock ring 170 can support a portion of the motor armature pinion 54' and inhibit deflection of the motor armature pinion 54' away from the output gear 188 such as during a stall condition. For example, if the power drill locks up or is in a stall condition, the motor armature pinion 54' can have a tendency to deflect away from the output gear 188. The structural support provided on the motor armature pinion 54' by the bore of the spindle lock ring 170 can inhibit or resist such this deflection. The output gear 188 can be configured as a single output gear or can be part of a multiple output gear configuration as described above with cooperation with the output spindle 70.

While the disclosure has been described in the specification and illustrated in the drawings with reference to various embodiments, it will be understood by those skilled in the art that various changes may be made and equivalents may be substituted for elements thereof without departing from the scope of the disclosure as defined in the claims. For example, while the second gear 78 is shown toward the front of the forward housing 18, the relative positions of the first and second gears 76 and 78 may be reversed, such that the first gear 76 is toward the front of the forward housing 18. Furthermore, the mixing and matching of features, elements and/or functions between various embodiments is expressly contemplated herein so that one of ordinary skill in the art would appreciate from this disclosure that features, elements and/or functions of one embodiment may be incorporated into another embodiment as appropriate, unless described otherwise above. Moreover, many modifications may be made to adapt a particular situation or material to the teachings of the disclosure without departing from the essential scope thereof. Therefore, it is intended that the disclosure not be limited to the particular embodiment illustrated by the drawings and described in the specification as the best mode presently contemplated for carrying out this disclosure, but that the disclosure will include any embodiments falling within the foregoing description and the appended claims.

What is claimed is:

1. A power drill comprising:

a housing having a motor including an output member;

a rotary output spindle journaled in the housing;

a transmission disposed in the housing and including a first output gear and a second output gear that are moveable relative to one another along the output spindle, wherein the transmission selectively couples the output member to the output spindle through one of the first output gear or the second output gear for rotating the output spindle at one of a first speed or a second speed, respectively; and a speed shift assembly comprising:

a guide plate that coordinates movement of the first and second output gears; and a user engageable member that is movable between a first speed position, in which the first and second output gears are moved into respective first positions in which rotary power is transmitted through the first output gear but not through the second output gear, and a second speed position in which the first and second output gears are moved into respective second positions in which rotary power is transmitted through the second output gear but not through the first output gear.

2. A power drill comprising:

a housing having a motor including an output member;

a rotary output spindle journaled in the housing;

a transmission disposed in the housing and including a first output gear and a second output gear, wherein the transmission selectively couples the output member to the output spindle through one of the first output gear or the second output gear for rotating the output spindle at one of a first speed or a second speed, respectively; and a speed shift assembly comprising:

a guide plate that selectively influences movement of at least one of the first and second output gears; and a user engageable member that is movable between a first speed position that corresponds to the first output gear being coupled for rotation with the output member and a second speed position that corresponds to the second output gear being coupled for rotation with the output member wherein movement between the first and second positions causes the second output gear to at least partially nest into the first output gear;

wherein the first output gear includes an annular depression that selectively receives an annular extension on the second output gear in a nested position.

3. The power drill of claim 2 wherein the first output gear includes a first circumferential sidewall and the second output gear includes a second circumferential sidewall, wherein the first circumferential sidewall at least partially surrounds the second circumferential sidewall in the nested position.

4. The power drill of claim 3 wherein more than half of an axial length of the second circumferential sidewall is nested into an axial length of the annular depression in the nested position.

5. The power drill of claim 4 wherein substantially about 90% of the axial length of the second circumferential sidewall is nested into the axial length of the annular depression in the nested position.

6. The power drill of claim 2, further comprising a biasing member disposed between the first and second output gears.

7. The power drill of claim 6 wherein the biasing member is configured to urge the first output gear away from the second output gear until complementary teeth on the first output gear and the output member align during engagement of the first output gear with the output member.

8. The power drill of claim 6 wherein the biasing member is configured to urge the second output gear away from the first output gear while complementary teeth on the second output gear and the output member align during engagement of the second output gear with the output member.

9. The power drill of claim 2 wherein the guide plate comprises a U-shaped body having opposing side flanges connected by an intermediate portion, wherein the opposing side flanges alternatively engage one of the first or second gears during shifting between the first and second speed positions, respectively.

10. The power drill of claim 9 wherein the intermediate portion defines a slot that is configured to receive an actuator pin associated with the user engageable member and wherein the actuator pin is guided along the slot during movement of the user engageable member between the first and second speed positions.

11. The power drill of claim 10 wherein the user engageable member comprises a knob configured for complete 360 degree rotation around an axis and wherein rotation of the knob influences linear translation of the guide plate along a guide rod during movement of the user engageable member between the first and second positions.

12. A power drill comprising:

a housing having a motor including an output member;

a rotary output spindle journaled in the housing;

a transmission disposed in the housing and including a first output gear and a second output gear, wherein the transmission selectively couples the output member to the output spindle through one of the first output gear or the second output gear for rotating the output spindle at one of a first speed or a second speed, respectively; and a speed shift assembly comprising:

a guide plate that is slidably disposed along a guide rod, the guide plate configured to selectively and alternatively influence movement of the first and second output gears respectively; and a biasing member journaled around the output spindle between the first and second output gears; and a user engageable member that is movable between a first speed position that corresponds to the first output gear being coupled for rotation with the output member and a second speed position that corresponds to the second output gear being coupled for rotation with the output member wherein movement between the first and second positions causes the second output gear to at least partially nest into the first output gear against a biasing force of the biasing member.

13. The power drill of claim 12 wherein the first output gear includes an annular depression that selectively receives an annular extension on the second output gear in a nested position.

14. The power drill of claim 13 wherein the first output gear includes a first circumferential sidewall and the second output gear includes a second circumferential sidewall, wherein the first circumferential sidewall at least partially surrounds the second output gear in the nested position.

15. The power drill of claim 14 wherein more than half of the second circumferential sidewall is nested into the annular depression in the nested position.

16. The power drill of claim 13 wherein the biasing member is configured to urge the first output gear away from the second output gear while complementary teeth on the first output gear and the output member align during engagement of the first output gear with the output member and wherein the biasing member is configured to urge the second output gear away from the first output gear while complementary teeth on the second output gear and the output member align during engagement of the second output gear with the output member.

17. The power drill of claim 16 wherein the intermediate portion defines a slot that is configured to receive an actuator pin associated with the user engageable member and wherein the actuator pin is guided along the slot during movement of the user engageable member between the first and second speed positions.

18. The power drill of claim 17 wherein the user engageable member comprises a knob configured for complete 360 degree rotation around an axis and wherein rotation of the knob influences linear translation of the guide plate along a guide rod during movement of the user engageable member between the first and second positions.

19. A power drill comprising:

a housing having a motor including an output member;

a rotary output spindle journaled in the housing;

a transmission disposed in the housing and including a first output gear having a first axial thickness and a second output gear having a second axial thickness, wherein the transmission selectively couples the output member to the output spindle through one of the first output gear or the second output gear for rotating the output spindle at one of a first speed or a second speed, respectively; and a speed shift assembly comprising:

a guide plate that is slidably disposed along a guide rod, the guide plate having first and second flanges that are configured to selectively and alternatively influence axial translation of the first and second output gears, respectively; and a user engageable member that is movable between a first speed position that corresponds to the first output gear being coupled for rotation with the output member and a second speed position that corresponds to the second output gear being coupled for rotation with the output member wherein movement between the first and second positions causes the second output gear to occupy a nested position with the first output gear;

wherein an axial distance measured between an outermost surface of the first gear that opposes the first flange and an outermost surface of the second gear that opposes the second flange, while in the nested position, is less than a sum of the first and second axial thicknesses.

20. The power drill of claim 19 wherein the first output gear includes an annular depression that selectively receives an annular extension on the second output gear in a nested position.

21. The power drill of claim 20 wherein the outer dimension of first output gear includes a circumferential sidewall that at least partially surrounds the second output gear in the nested position.

22. The power drill of claim 20 wherein the biasing member is configured to urge the first output gear away from the second output gear while complementary teeth on the first output gear and the output member align during engagement of the first output gear with the output member and wherein the biasing member is configured to urge the second output gear away from the first output gear while complementary teeth on the second output gear and the output member align during engagement of the second output gear with the output member.

23. The power drill of claim 19 wherein the user engageable member comprises a knob configured for complete 360 degree rotation around an axis and wherein rotation of the knob influences linear translation of the guide plate along a guide rod during movement of the user engageable member between the first and second positions.

24. The power drill of claim 19, further comprising a rotatably fixed hammer member and a rotatable hammer member each mounted concentrically about the output spindle, the rotatable hammer member being mounted on the spindle to rotate therewith, the rotatable hammer member cooperating with the rotatably fixed hammer member to deliver vibratory impacts to the output spindle in a hammer drilling mode.

25. The power drill of claim 19, further comprising a spindle lock ring that surrounds the output spindle and defines a receiving portion that engages a motor pinion associated with the output member.

26. The power drill of claim 25 wherein the receiving portion defines a bore that at least partially receives a portion of the motor pinion.

27. The power drill of claim 1, further comprising a spring disposed between the first and second output gears, the spring biasing the first and second output gears apart from one another.

* * * * *